United States Patent
Zhou et al.

(10) Patent No.: US 9,195,664 B2
(45) Date of Patent: Nov. 24, 2015

(54) METHOD AND DEVICE BASED ON ANDROID SYSTEM FOR TRACKING IMPORTED FILE

(71) Applicant: TENCENT TECHNOLOGY (SHENZHEN) COMPANY LIMITED, Shenzhen (CN)

(72) Inventors: Xing Zhou, Shenzhen (CN); Bin Yu, Shenzhen (CN); Qiao Ren, Shenzhen (CN); Shizhu Huang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 275 days.

(21) Appl. No.: 14/023,222

(22) Filed: Sep. 10, 2013

(65) Prior Publication Data

US 2014/0040242 A1 Feb. 6, 2014

Related U.S. Application Data

(63) Continuation of application No. PCT/CN2013/080255, filed on Jul. 27, 2013.

(30) Foreign Application Priority Data

Aug. 1, 2012 (CN) .......................... 2012 1 0270362

(51) Int. Cl.
*G06F 17/30* (2006.01)

(52) U.S. Cl.
CPC .... *G06F 17/30067* (2013.01); *G06F 17/30091* (2013.01); *G06F 17/30144* (2013.01)

(58) Field of Classification Search
CPC .................. G06F 17/30864; G06F 17/30781; G06F 17/30067
USPC .......................................... 707/722, 723, 724
See application file for complete search history.

(56) References Cited

U.S. PATENT DOCUMENTS

2006/0106866 A1* 5/2006 Green et al. ................ 707/104.1
2006/0253905 A1* 11/2006 Mansel ............................ 726/23

(Continued)

FOREIGN PATENT DOCUMENTS

CN 101520792 A * 9/2009

OTHER PUBLICATIONS

Tencent Technology, ISRWO, PCT/CN2013/080255 Oct. 31, 2013, 9 pgs.

*Primary Examiner* — Syed Hasan
*Assistant Examiner* — Ahmed Abraham
(74) *Attorney, Agent, or Firm* — Morgan, Lewis & Bockius LLP

(57) ABSTRACT

An electronic device is configured to exchange data with a mobile storage device. The device monitors for a first event corresponding to the storage device being unmounted. In response to detecting the first event, the device records a first time. After the first event, the device monitors for a second event corresponding to the storage device being mounted. In response to detecting the second event, the device records a second time. After the second event, the device performs a scan of the storage device, stores the scanned data in a database, and records a storage path corresponding to the scanned data in the database. The device monitors for a third event corresponding to completion of the scan, and records a third time. The device retrieves a dataset with a timestamp between the first time and the third time and displays the dataset and the timestamp.

17 Claims, 8 Drawing Sheets

(56) References Cited

U.S. PATENT DOCUMENTS

| | | | |
|---|---|---|---|
| 2008/0288698 A1* | 11/2008 | Lin et al. | 710/301 |
| 2011/0246922 A1* | 10/2011 | Koenig et al. | 715/771 |
| 2013/0308874 A1* | 1/2013 | Togashi et al. | 382/264 |

* cited by examiner

METHOD AND DEVICE BASED ON ANDROID SYSTEM FOR TRACKING IMPORTED FILE

RELATED APPLICATION

This application is a continuation application of PCT Patent Application No. PCT/CN2013/080255, entitled "METHOD AND DEVICE BASED ON ANDROID SYSTEM FOR TRACKING IMPORTED FILE" filed on Jul. 27, 2013, which claims priority to Chinese Patent Application No. CN201210270362.3, entitled "METHOD AND APPARATUS BASED ON ANDROID SYSTEM FOR MONITORING DOCUMENTS IMPORTED INTO A MOBILE DEVICE" filed on Aug. 1, 2012, both of which are hereby incorporated by reference in its entirety.

TECHNICAL FIELD

The present invention relates to the field of computer technology, and particularly, to a method and system based on an Android system for tracking an imported file.

BACKGROUND

The Android operating system is a Linux-based open-source operating system that is mainly used in portable devices. In 2005, Google acquired, invested and established the Open Handset Alliance to develop and improve the Android system so as to gradually extend it to tablet PCs and other fields. Main competitors of the Android operating system are Apple's iOS system and RIM's Blackberry OS system. In the first quarter of the year 2011, the Android operating system, for the first time, exceeded the Symbian system in the global market share to be the world number one. The data from February 2012 show that the Android operating system accounted for 59% of the global smartphone operating system market, and 68.4% in China.

Mobile phones using the Android operating system usually come with at least one Secure Digital Memory Card (referred to as an SD card for short), and when a user disconnects an SD card from a mobile phone (that is, the SD card is unmounted), then connects the SD card to a computer so as to copy data from the computer to the SD card, and then inserts the SD card back into the mobile phone (that is, the SD card is mounted), it usually requires the user to use another auxiliary software tool to find the files that are just imported by the SD card into the mobile phone, and those files cannot be quickly located.

SUMMARY

To address the aforementioned problems, some implementations of the present invention provide a computer-implemented method for tracking an imported file on an operating system of an electronic device (e.g., a personal electronic device such as a smart-phone, tablet, or smart-television), the electronic device being configured to exchange data with a first mobile storage device. The method includes monitoring the operating system for a first event corresponding to the first mobile storage device being unmounted from the electronic device. In response to detecting the first event, the device records a first time of the first event corresponding to the first mobile storage device being unmounted from the electronic device. After the first event, device monitors the operating system for a second event corresponding to the first mobile storage device being mounted into the electronic device. In response to detecting the second event, the device records a second time of the second event corresponding to the first mobile storage device being mounted into the electronic device. After the second event, the device performs a scan of the first mobile storage device, stores the scanned data in a database of the operating system, and records a first storage path corresponding to the scanned data in the database. The device further monitors the operating system for a third event that corresponds to completion of the scan, and records, in response to detecting the third event, a third time corresponding to the scan being completed. The device later accesses the database and retrieves a dataset with a timestamp greater than first time and smaller than the third time, in accordance with the first storage path and the timestamp. Finally, the device displays the retrieved dataset and the timestamp on a display of the device.

To address the aforementioned problems, some implementations of the present invention provide an electronic device. The electronic device includes one or more processors, memory, and one or more programs. The one or more programs are stored in memory and configured to be executed by the one or more processors. The one or more programs include an operating system and instructions that when executed by the one or more processors cause the electronic device to monitor the operating system for a first event corresponding to a first mobile storage device being unmounted from the electronic device. In response to detecting the first event, the device records a first time of the first event corresponding to the first mobile storage device being unmounted from the electronic device. After the first event, the device monitors the operating system for a second event corresponding to the first mobile storage device being mounted into the electronic device. In response to detecting the second event, the device records a second time of the second event corresponding to the first mobile storage device being mounted into the electronic device. After the second event, the device performs a scan of the first mobile storage device, stores the scanned data in a database of the operating system, and records a first storage path corresponding to the scanned data in the database. The device then monitors the operating system for a third event that corresponds to completion of the scan and records, in response to detecting the third event, a third time corresponding to the scan being completed. Later, the device accesses the database and retrieves a dataset with a timestamp greater than first time and smaller than the third time, in accordance with the first storage path and the timestamp. Finally, the device displays the retrieved dataset and the timestamp on a display of the device.

To address the aforementioned problems, some implementations of the present invention provide a non-transitory computer readable storage medium storing one or more programs. The one or more programs include an operating system and instructions, which, when executed by an electronic device with one or more processors and memory, cause the electronic device to monitor the operating system for a first event corresponding to a first mobile storage device being unmounted from the electronic device. In response to detecting the first event, the device records a first time of the first event corresponding to the first mobile storage device being unmounted from the electronic device. After the first event, the device monitors the operating system for a second event corresponding to the first mobile storage device being mounted into the electronic device. In response to detecting the second event, the device records a second time of the second event corresponding to the first mobile storage device being mounted into the electronic device. After the second event, the device performs a scan of the first mobile storage device, stores the scanned data in a database of the operating system, and records a first storage path corresponding to the scanned data in the database. The device then monitors the operating system for a third event that corresponds to completion of the scan and records, in response to detecting the third event, a third time corresponding to the scan being completed. Later, the device accesses the database, and retrieves a dataset with a timestamp greater than first time and smaller than the third time, in accordance with the first storage path and the timestamp. Finally, the device displays the retrieved dataset and the timestamp on a display of the device.

BRIEF DESCRIPTION OF DRAWINGS

For a better understanding, reference should be made to the following detailed description taken in conjunction with the accompanying drawings, in which.

Like reference numerals refer to corresponding parts throughout the drawings.

DETAILED DESCRIPTION

Reference will now be made in detail to various implementations, examples of which are illustrated in the accompanying drawings. In the following detailed description, numerous specific details are set forth in order to provide a thorough understanding of the present disclosure and the described implementations herein. However, implementations described herein may be practiced without these specific details. In other instances, well-known methods, procedures, components, and mechanical apparatus have not been described in detail so as not to unnecessarily obscure aspects of the implementations.

Figure 1:
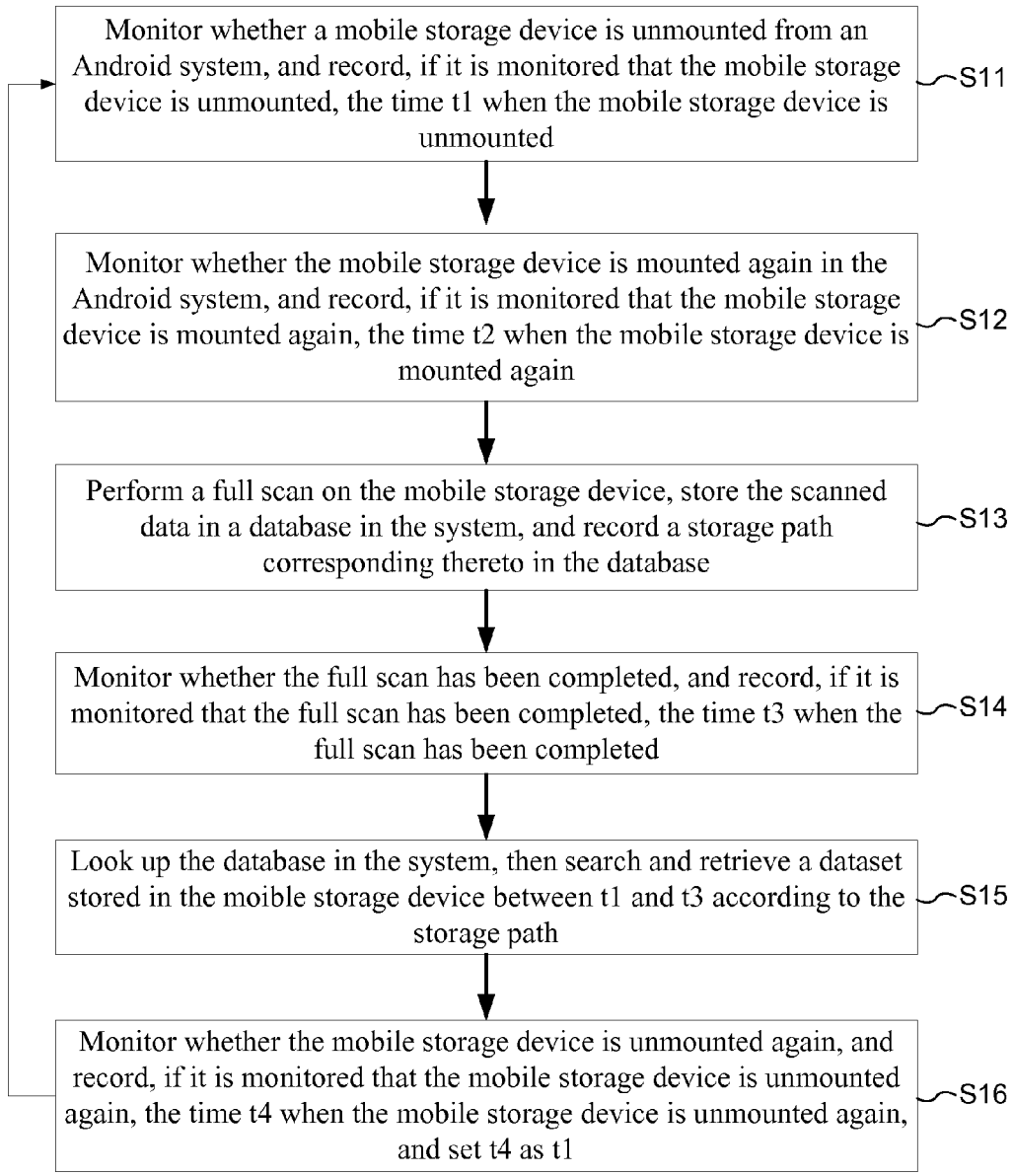
FIG. 1 is a schematic flowchart of a method for tracking an imported file, in accordance with some implementations.

FIG. 1 is a schematic flowchart of a method 100 (e.g., based on an Android system) for tracking an imported file, in accordance with some implementations. The description of method 100 takes, as an example, the situation where a consumer electronic product is using the Android operating system and comes with a mobile storage device (such as an SD card). In some implementations, the electronic device mentioned herein is a mobile phone, a tablet PC, a desktop computer, and the like.

Referring to FIG. 1, the method 100 comprises the operations of:

S11: monitor whether a mobile storage device is unmounted by an Android system, and recording, if it is monitored that the mobile storage device is unmounted, the time t1 when the mobile storage device is unmounted.

In some implementations, in operation S11, first a mobile storage device unmounting event (Intent.ACTION_MEDIA_EJECT) is registered in a configuration file (for example, AndroidManifest.xml). When it is monitored that the mobile storage device is unmounted by the Android system, an unmounting event of the mobile storage device is triggered, and the time t1 when the mobile storage device is unmounted is the time of the unmounting event of the mobile storage device (Intent.ACTION_MEDIA_EJECT) being triggered. In some implementations, the mobile storage device is preferably a Secure Digital Memory Card (referred to as an SD card for short). Of course, the size of the SD card can be selected according to different needs and the present invention is not limited thereto.

S12: monitor whether the mobile storage device is mounted in the Android system again, and recording, if it is monitored that the mobile storage device is mounted again, the time t2 when the mobile storage device is mounted again.

In some implementations, in operation S12, first a mobile storage device mounting event (Intent.ACTION_MEDIA_MOUNTED) is registered in a configuration file (for example, AndroidManifest.xml). When it is monitored that the mobile storage device is mounted in the Android system again, a mounting event of the mobile storage device (Intent.ACTION_MEDIA_MOUNTED) is triggered, and the time t2 when the mobile storage device is mounted again is the time of the mounting event of the mobile storage device being triggered.

S13: perform a full scan on the mobile storage device, store the scanned data in a database of the system and record a storage path corresponding thereto.

S14: monitor whether the full scan has been completed, and record, if it is monitored that the full scan has been completed, the time t3 when the full scan has been completed.

In some implementations, in operation S14, a full scan completed event (Intent.ACTION_MEDIA_SCANNER_FINISHED) is registered in a configuration file (for example, AndroidManifest.xml). When it is monitored that the full scan has been completed, the full scan completed event is triggered, and the time t3 when the full scan has been completed is the time of the full scan completed event (Intent.ACTION_MEDIA_SCANNER_FINISHED) being triggered.

Specifically, before operations S11, S12 and 514, the process for registering the mobile storage device unmounting event (Intent.ACTION_MEDIA_EJECT), the mobile storage device mounting event (Intent.ACTION_MEDIA_MOUNTED) and the full scan completed event (Intent.ACTION_MEDIA_SCANNER_FINISHED) in the AndroidManifest.xml file can be for example as follows:

```
<receiver android:name=".USBReceiver">
  <intent-filter>
    <action android:name="android.intent.action.MEDIA_EJECT"/>
    <data android:scheme="file"/>
  </intent-filter>
  <intent-filter>
    <action android:name="android.intent.action.-MEDIA_MOUNTED"/>
    <data android:scheme="file"/>
  </intent-filter>
  <intent-filter>
    <action android:name="android.intent.action.-MEDIA_SCANNER_FINISHED"/>
    <data android:scheme="file"/>
  </intent-filter>
</receiver>
```

S15: look up the database of the system, and then search and retrieve a dataset with a mounting time greater than t1 and smaller than t3 according to the storage path.

In operation S15, the retrieved dataset is a file imported into the Android system via the mobile storage device (SD card).

It should be appreciated that, in operation S15, the dataset with a mounting time greater than t2 and smaller than t3 can also be searched and retrieved according to the storage path when looking up the database of the system.

Furthermore, the method 100 (e.g., based on an Android system) for tracking an imported file in some implementations further comprises operation S16: monitoring whether the mobile storage device is unmounted again, and recording, if it is monitored that the mobile storage device is unmounted again, the time t4 when the mobile storage device is unmounted again, and taking t4 as t1 and repeating operation S11. That is to say, when the mobile storage device is unmounted again, the system starts tracking the imported file over again.

The method 100 (e.g., based on an Android system) for tracking an imported file, in some circumstances, helps users quickly find a file imported via a mobile storage device (an SD card) within a certain period of time.

Figure 2:
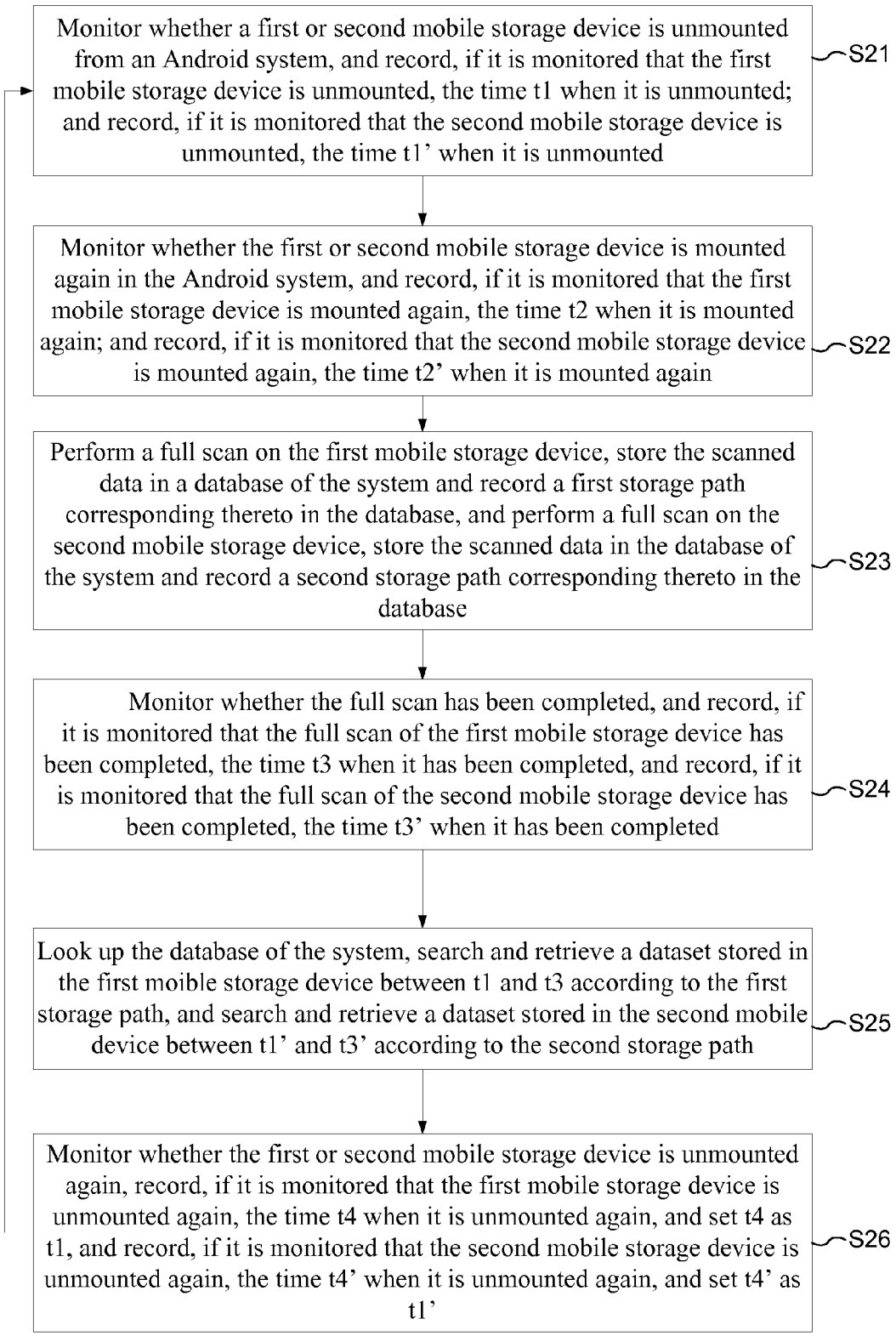
FIG. 2 is a schematic flowchart of another method for tracking an imported file, in accordance with some implementations.

FIG. 2 is a schematic flowchart of a method 200 (e.g., based on an Android system) for tracking an imported file. according to some implementations. The description of method 200 takes, as an example, the situation where a consumer electronic product (e.g., device) using the Android operating system comes with a plurality of mobile storage devices (such as two SD cards), The consumer electronic product mentioned here can be either a mobile phone, tablet PC, laptop computer or the like.

S21: monitor whether a first or second mobile storage device is unmounted by the Android system, and record, when the monitoring determines that the first mobile storage device is unmounted, the time t1 when it is unmounted; and record, when the monitoring determines that the second mobile storage device is unmounted, the time t1' when it is unmounted.

S22: monitor whether the first or second mobile storage device is mounted again in the Android system, and record, when the monitoring determines that the first mobile storage device is mounted again, the time t2 when it is mounted again; and record, when the monitoring determines that the second mobile storage device is mounted again, the time t2' when it is mounted again.

S23: perform a full scan on the first mobile storage device, store the scanned data in a database of the system and record a first storage path corresponding thereto, and perform a full scan on the second mobile storage device, store the scanned data in the database of the system and record a second storage path corresponding thereto.

S24: monitor whether the full scan has been completed, and record, when the monitoring determines that the full scan of the first mobile storage device has been completed, the time t3 when it has been completed, and record, when the monitoring determines that the full scan of the second mobile storage device has been completed, the time t3' when it has been completed.

S25: look up the database of the system, search and retrieve a dataset with a mounting time greater than t1 and smaller than t3 according to the first storage path, and search and retrieve a dataset with a mounting time greater than t1' and smaller than t3' according to the second storage path. In some implementations, the device displays the retrieved dataset on a display. In some embodiments, the device further displays the timestamps associated with files in the retrieved dataset indicating when they were stored in the first or second mobile storage device.

It should be appreciated that, in operation S25, it is also possible to search and retrieve a dataset with a mounting time greater than t2 and smaller than t3 according to the first storage path and search and retrieve a dataset with a mounting time greater than t2' and smaller than t3' according to the second storage path when looking up the database of the system.

Furthermore, the method 200 (e.g., based on an Android system) for tracking an imported file, in some implementations, further comprises operation S26: monitor whether the first or second mobile storage device is unmounted again, and record, when the monitoring determines that the first mobile storage device is unmounted again, the time t4 when it is unmounted again, and taking t4 as t1 and repeat operation S21, and record, when the monitoring determines that the second mobile storage device is unmounted again, the time t4' when it is unmounted again, and set t4' as t1' and repeat operation S21.

In some implementations, before operations S21, S22 and S24, the mobile storage device unmounting event (Intent.ACTION_MEDIA_EJECT), the mobile storage device mounting event (Intent.ACTION_MEDIA_MOUNTED) and the full scan completed event (Intent.ACTION_MEDIA_SCANNER_FINISHED) can also be registered in the AndroidManifest.xml file, the process of which is basically the same as in method 100 and will not be described here.

It should be noted that the situation of more than two mobile storage devices can also be realized, as long as a full scan on a corresponding mobile storage device is performed and when storing the scanned data in a database of the system, the storage path corresponding thereto is recorded, and then a dataset is searched and retrieved according to the corresponding storage path when looking up the database of the system.

The method 200 (e.g., based on an Android system) for tracking an imported file helps users quickly find, in the Android system, a file imported via a plurality of mobile storage devices (SD cards) within a certain period of time.

Figure 3:
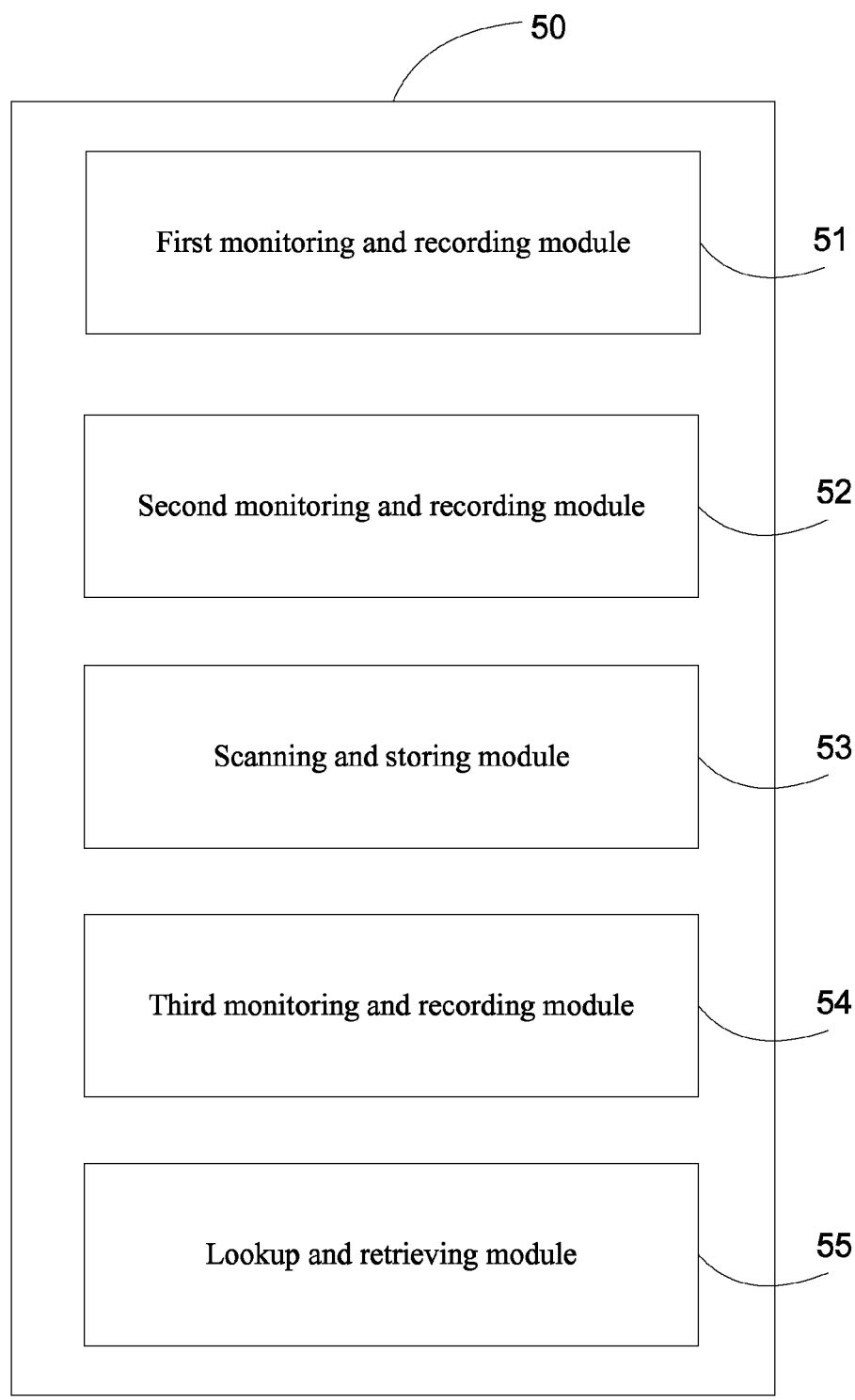
FIG. 3 is a structural schematic diagram of a device for tracking an imported file, in accordance with some implementations.

Referring to FIG. 3, some implementations of the present invention provide a device 50 (e.g., based on an Android system) for tracking an imported file. In some implementations, the abovementioned methods 100/200 are implemented in device 50.

The device 50 comprises: a first monitoring and recording module 51, a second monitoring and recording module 52, a scanning and storing module 53, a third monitoring and recording module 54, and a lookup and retrieving module 55.

The first monitoring and recording module 51 is used for monitoring whether a mobile storage device is unmounted by an Android system, and recording, when the monitoring determines that the mobile storage device is unmounted, the time t1 when the mobile storage device is unmounted. The second monitoring and recording module 52 is used for monitoring whether the mobile storage device is mounted in the Android system again, and recording, when the monitoring determines that the mobile storage device is mounted again, the time t2 when the mobile storage device is mounted again. The scanning and storing module 53 is used for performing a full scan on the mobile storage device, storing the scanned data in a database of the system and recording a first storage path corresponding thereto. The third monitoring and recording module 54 is used for monitoring whether the full scan has been completed, and recording, when the monitoring determines that the full scan has been completed, the time t3 when the full scan has been completed. The lookup and retrieving module 55 is used for looking up the database of the system, then searching and retrieving a dataset with a mounting time greater than t1 and smaller than t3. The mobile storage device in some implementations is an SD card.

Figure 4:
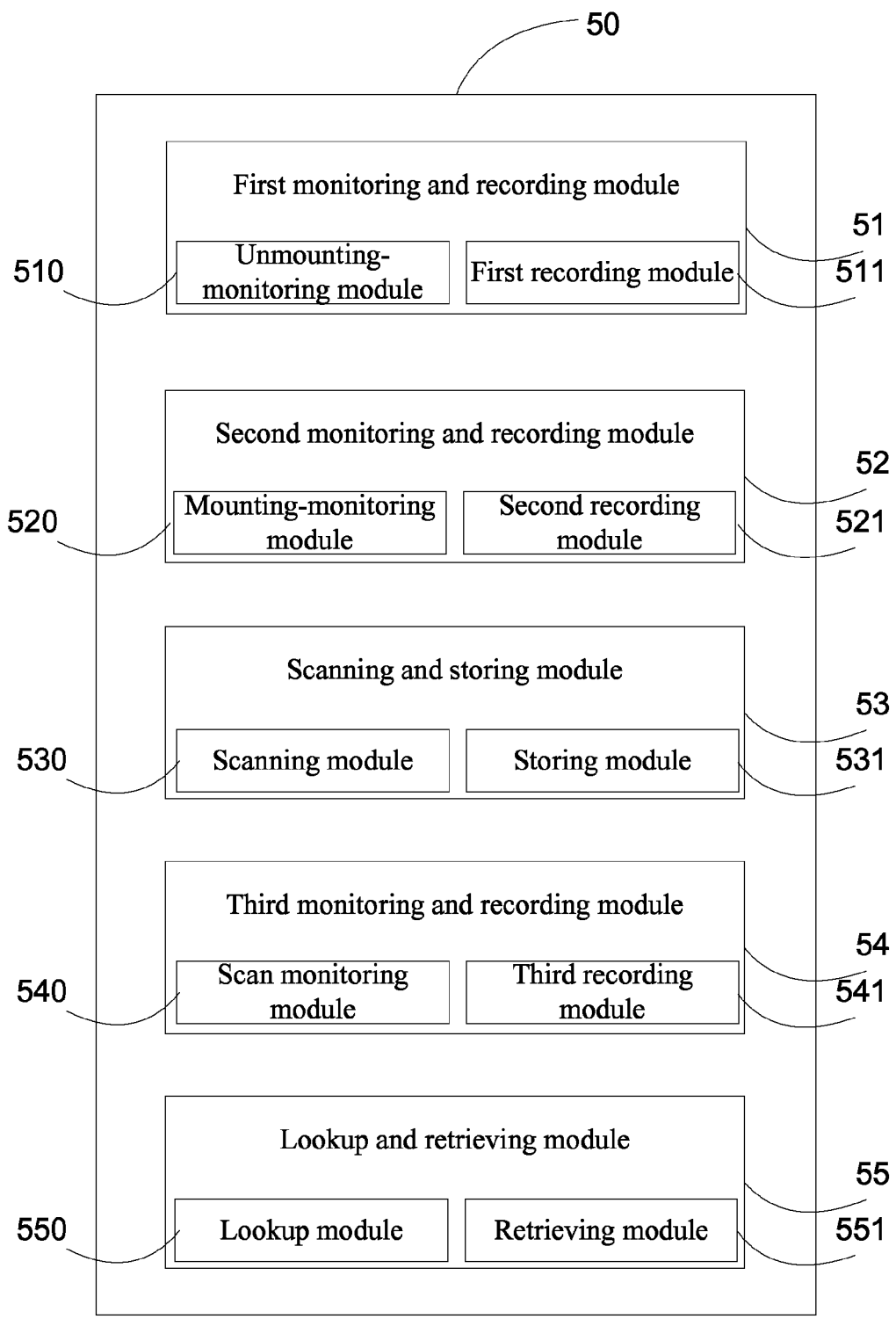
FIG. 4 is a structural schematic diagram of the device in FIG. 3, in accordance with some implementations.

Referring to FIG. 4, in some implementations, the first monitoring and recording module 51 comprises an unmounting-monitoring module 510 and a first recording module 511. The unmounting-monitoring module 510 is used for monitoring whether the mobile storage device is unmounted by the Android system; and the first recording module 511 is used for recording the time t1 when the mobile storage device is unmounted. The second monitoring and recording module 52 comprises a mounting-monitoring module 520 and a second recording module 521. The mounting-monitoring module 520 is used for monitoring whether the mobile storage device is mounted in the Android system again. The second recording module 521 is used for recording the time t2 when the mobile storage device is mounted again. The scanning and storing module 53 comprises a scanning module 530 and a storing module 531. The scanning module 530 is used for performing a full scan on the mobile storage device and the storing module 531 is used for storing the scanned data in a database of the system and recording a first storage path corresponding thereto. The third monitoring and recording module 54 comprises a full scan monitoring module 540 and a third recording module 541. The full scan monitoring module 540 is used for monitoring whether a full scan has been completed, and the third recording module 541 is used for recording the time t3 when the full scan has been completed. The lookup and retrieving module 55 comprises a lookup module 550 and a retrieving module 551, with the lookup module 550 being used for looking up the database of the system and the retrieving module 551 being used for searching and retrieving a dataset with a mounting time greater than t1 and smaller than t3.

A configuration file is stored in the device 50, which contains, registered therein, a mobile storage device unmounting event (Intent.ACTION_MEDIA_EJECT), a mobile storage device mounting event (Intent.ACTION_MEDIA_MOUNTED), and a full scan completed event (Intent.ACTION_MEDIA_SCANNER_FINISHED).

The device 50 (e.g., based on an Android system) for tracking an imported file helps users quickly find, in an Android system, a file imported via a plurality of mobile storage devices (SD cards) within a certain period of time.

Figure 5A:
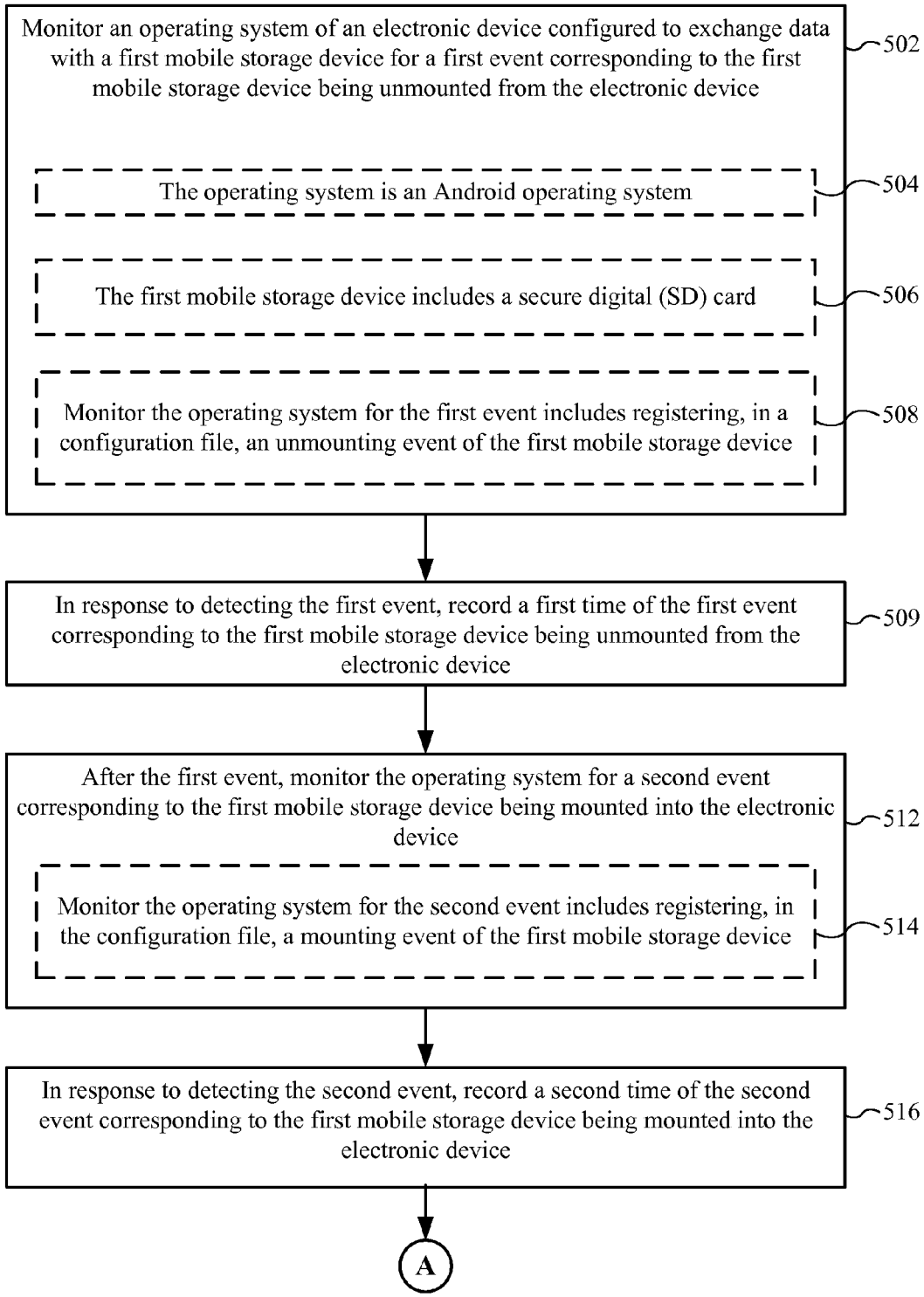
FIGS. 5A-5C is a schematic flowchart of another method for tracking an imported file, in accordance with some implementations.
Figure 5B:
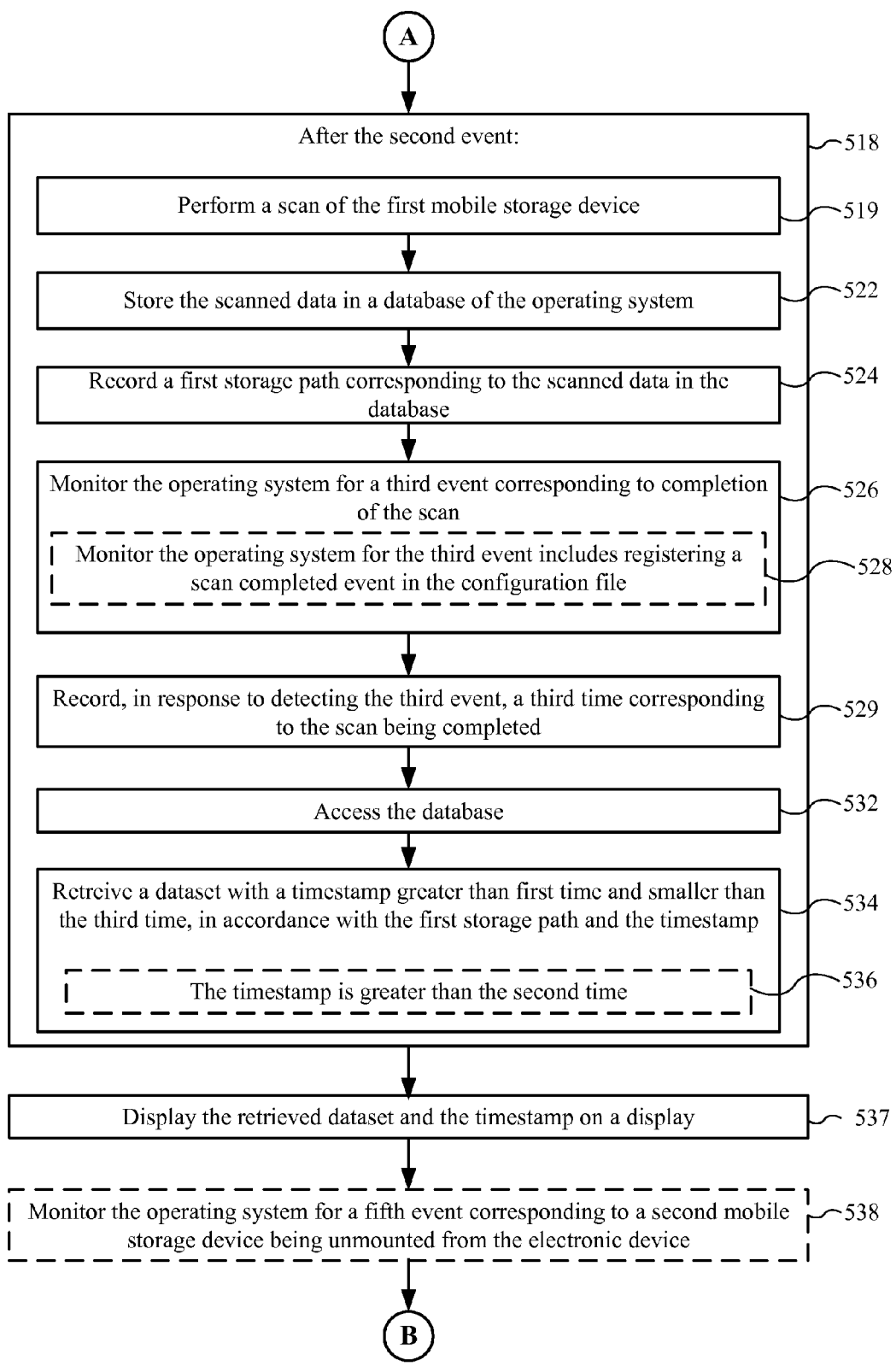
Figure 5C:
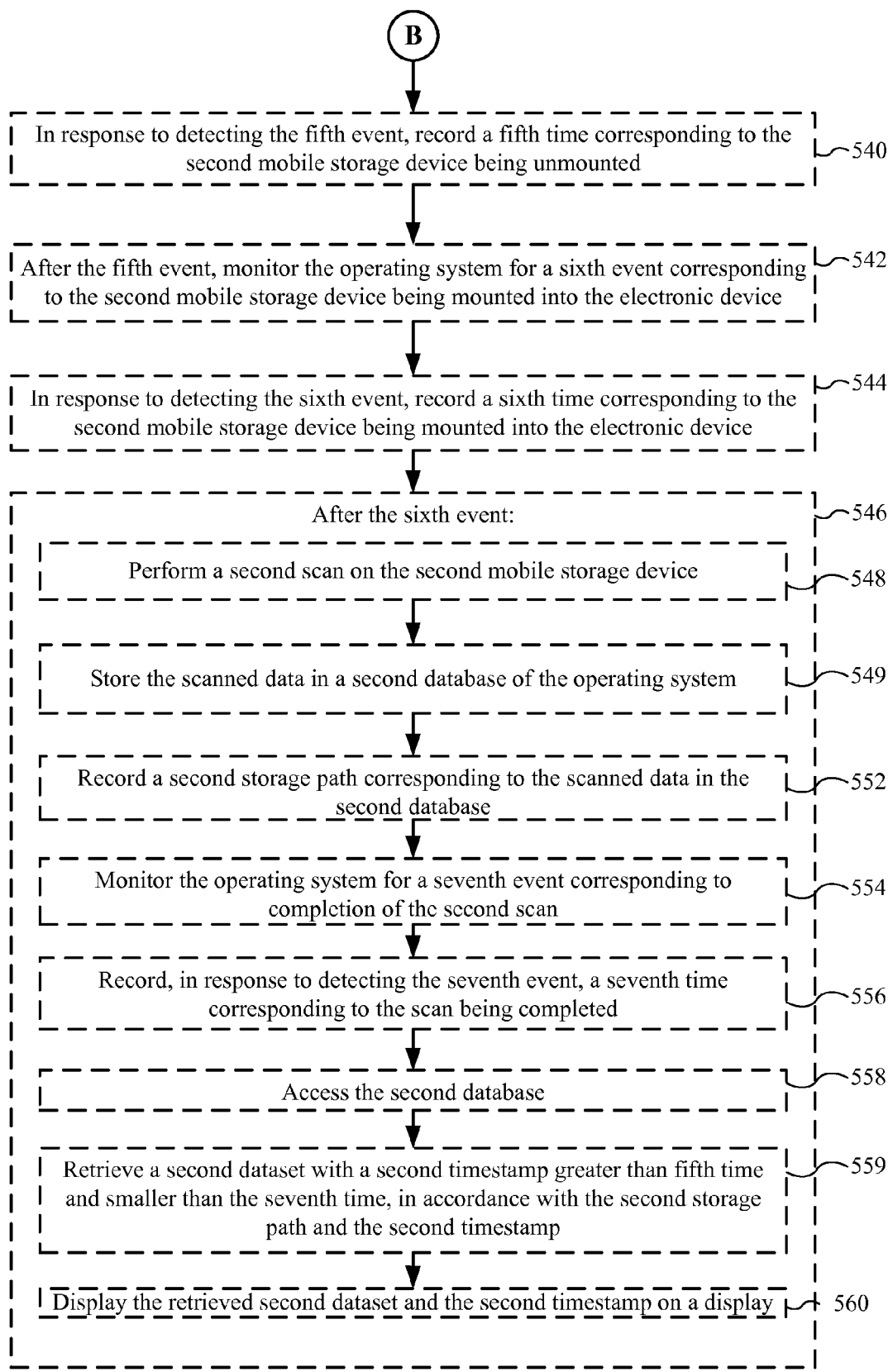

FIGS. 5A-5C is a schematic flowchart of a method 500 for tracking an imported file, in accordance with some implementations. In some implementations, the method 500 is performed at a device (e.g., device 50, FIG. 3 and FIG. 4, or device 602, FIG. 6) that includes an operating system and is configured to exchange data with a first mobile storage device.

The device monitors (502) the operating system for a first event corresponding to the first mobile storage device being unmounted from the electronic device. In some implementations, the operating system is (504) an Android operating system. In some implementations, the first mobile storage devices includes (506) a secure digital (SD) card. In some implementations, monitoring the operating system for the first event includes (508) registering, in a configuration file, an unmounting event of the first mobile storage device. In response to detecting the first event, the electronic device records (509) a first time of the first event corresponding to the first mobile storage device being unmounted from the electronic device.

After the first event, the device monitors (512) the operating system for a second event corresponding to the first mobile storage device being mounted into the electronic device. In some implementations, monitoring the operating system for the second event includes registering (514), in the configuration file, a mounting event of the first mobile storage device. In response to detecting the second event, the electronic device records (516) a second time of the second event corresponding to the first mobile storage device being mounted into the electronic device.

After the second event (518) the device performs (519) a scan of the first mobile storage device (e.g., imports files from the first mobile storage device, and/or performs a synchronization operation with the first mobile storage device), stores (522) the scanned data in a database of the operating system, and records (524) a first storage path corresponding to the scanned data in the database.

The device then monitors (526) the operating system for a third event corresponding to completion of the scan. In some implementations, monitoring the operating system for the third event includes registering (528) a scan completed event in the configuration file. The device records (529), in response to detecting the third event, a third time corresponding to the scan being completed.

At a later time (e.g., when the a particular file that was imported needs to be accesses), the device accesses (532) the database and retrieves (534) a dataset with a timestamp greater than first time and smaller than the third time, in accordance with the first storage path and the timestamp. In this manner, the device limits its search of files to files with a corresponding timestamp that matches the time during which the files were imported. In some implementations, the timestamp is greater than the second time (536). In some implementations, the retrieved dataset is a file imported into the device via the mobile storage device (SD card). Finally, the device displays (537) the retrieved dataset and the timestamp on a display of the device. In some embodiments, the retrieved dataset includes multiple files, each file having multiple attributes such as a timestamp, a source identifier and a file type. The device lists the files on the display by their respective timestamps, source identifiers and file types. The timestamp of a file indicates when the file is stored in the mobile storage device. The source identifier of the file indicates where the file is originally from before it arrives at the mobile storage device. For example, if the file is transferred from a PC to the mobile storage device through a USB cable, the source identifier may be the directory of the file in the file system of the PC. If the file is directly downloaded into the mobile storage device from a remote web server when the mobile storage device is coupled to the PC, the source identifier may be the URL of the file on the Internet. The file type information enables the operating system to invoke an appropriate application program for processing the file. For example, if the file is a MP3 file, a user selection of the file triggers the operating system to identify a MP3 player to play the file.

In some implementations, the device is configured to exchange data with a plurality of mobile storage devices. In this case, the device monitors (538) the operating system for a fifth event corresponding to a second mobile storage device being unmounted from the electronic device. In response to detecting the fifth event, the device records (540) a fifth time corresponding to the second mobile storage device being unmounted. After the fifth event, the device monitors (542) the operating system for a sixth event corresponding to the second mobile storage device being mounted into the electronic device again. In response to detecting the sixth event, the device records (544) a sixth time corresponding to the second mobile storage device being mounted into the electronic device.

After the sixth event (546), the device performs (548) a second scan on the second mobile storage devices, stores (550) the scanned data in a second database of the operating system, and records (552) a second storage path corresponding to the scanned data in the second database.

The device then monitors (554) the operating system for a seventh event corresponding to completion of the second scan. The device records (556), in response to detecting the seventh event, a seventh time corresponding to the scan being completed. Later, the device accesses (558) the second database and retrieves (559) a second dataset with a second timestamp greater than fifth time and smaller than the seventh time, in accordance with the second storage path and the second timestamp. Finally, the device displays (560) the second dataset and the second timestamp on the display of the device.

Figure 6:
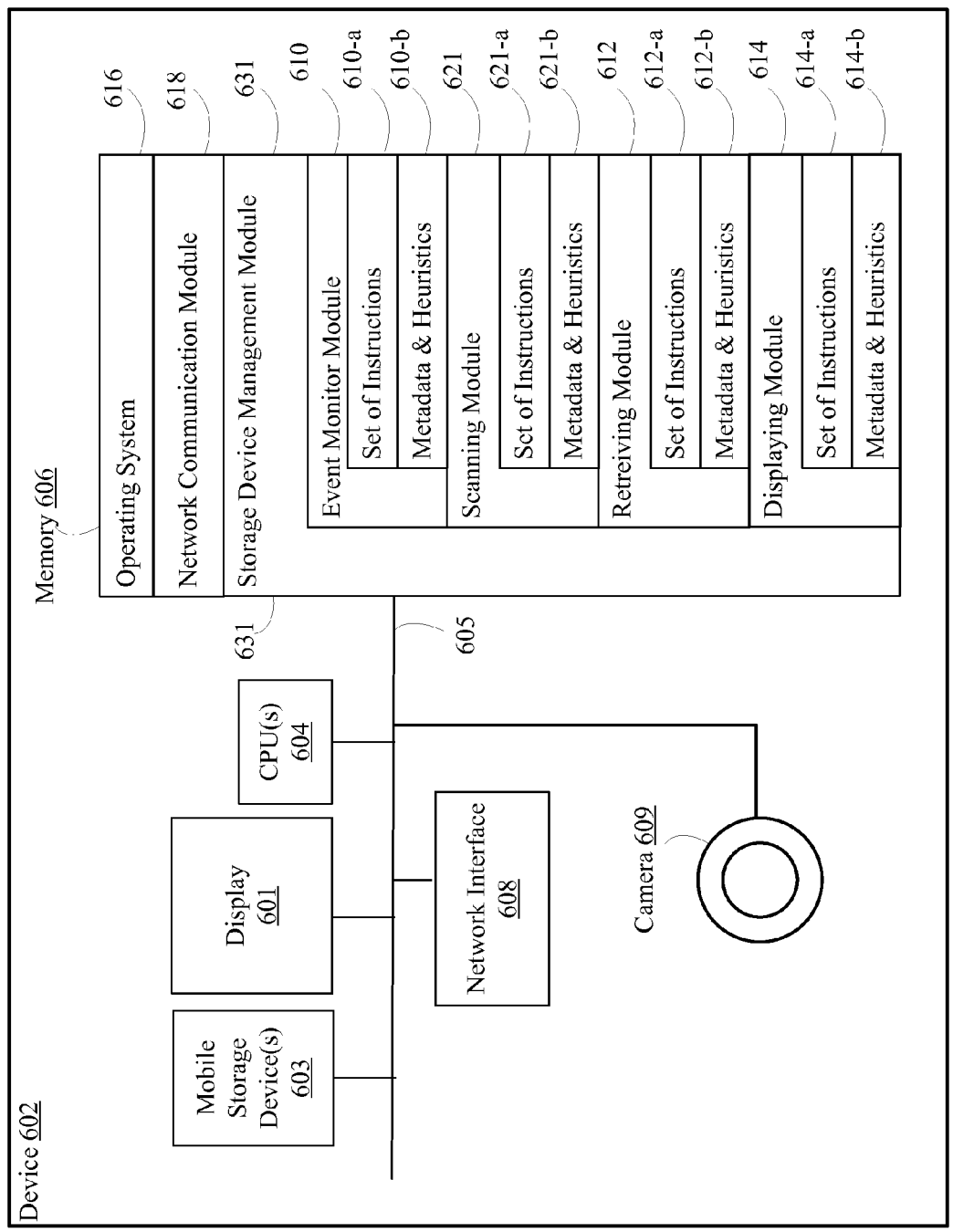
FIG. 6 is a structural schematic diagram of an electronic device for tracking an imported file, in accordance with some implementations.

FIG. 6 is a diagram of an example implementation of a device 602 (e.g., a laptop, tablet, smart phone, etc.) for tracking an imported file, in accordance with some implementations. While certain specific features are illustrated, those skilled in the art will appreciate from the present disclosure that various other features have not been illustrated for the sake of brevity and so as not to obscure more pertinent aspects of the implementations disclosed herein. To that end, the device 602 includes one or more processing units (CPU's) 604, one or more network or other communications interfaces 608, a display 601, memory 606, a digital camera 609, one or more mobile storage devices 603, and one or more communication buses 605 for interconnecting these and various other components. The communication buses 605 may include circuitry (sometimes called a chipset) that interconnects and controls communications between system components. Memory 606 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 606 may optionally include one or more storage devices remotely located from the CPU(s) 604. For example, in some implementations, the device is configured to be coupled with one or more mobile storage devices (e.g., SD cards) and is further configured to import data (e.g., files) from the mobile storage devices. Memory 606, including the non-volatile and volatile memory device(s) within memory 606, comprises a non-transitory computer readable storage medium.

In some implementations, memory 606 or the non-transitory computer readable storage medium of memory 606 stores the following programs, modules and data structures, or a subset thereof including an operating system 616, a network communication module 618, and a storage device management module 631.

The operating system 616 includes procedures for handling various basic system services and for performing hardware dependent tasks.

The network communication module 618 facilitates communication with other devices via the one or more communication network interfaces 608 (wired or wireless) and one or more communication networks, such as the internet, other wide area networks, local area networks, metropolitan area networks, and so on.

In some implementations, the storage device management module 631 is configured to monitor the operating system for a first event corresponding to a first mobile storage device being unmounted from the device 602 (e.g., with event monitoring module 610). In response to detecting the first event, the storage device management module 631 records a first time of the first event corresponding to the first mobile storage device being unmounted from the device 602. After the first event, the storage device management module 631 monitors the operating system for a second event corresponding to the first mobile storage device being mounted into the device 602. In response to detecting the second event, the storage device management module 631 records a second time of the second event corresponding to the first mobile storage device being mounted into the device 602. After the second event, the storage device management module 631 performs a scan of the first mobile storage device, stores the scanned data in a database of the operating system (e.g., with scanning module 621), and records a first storage path corresponding to the scanned data in the database. The storage device management module 631 then monitors the operating system for a third event that corresponds to completion of the scan and records, in response to detecting the third event, a third time corresponding to the scan being completed. Later, the storage device management module 631 accesses the database and retrieves a dataset with a timestamp greater than first time and smaller than the third time (e.g., with retrieving module 612), in accordance with the first storage path and the timestamp. Finally, the storage device management module 631 displays the retrieved dataset and the timestamp on the display 601 (e.g., with the displaying module 614).

To that end, the event monitoring module 610 includes a set of instructions 610-*a* and heuristics and metadata 610-*b*. Similarly, the receiving module 621 includes a set of instructions 621-*a* as well as metadata and heuristics 621-*b*, parsing module 612 includes a set of instructions 612-*a* and metadata and heuristics 612-*b*, and displaying module 614 includes a set of instructions 614-*a* and metadata and heuristics 614-*b*.

The above disclosures are merely preferred implementations of the present invention, but are not intended to limit the scope of the claims of the present invention. Any equivalent change made according to the claims of the present invention modification still falls within the scope of the present invention.

While particular implementations are described above, it will be understood it is not intended to limit the invention to these particular implementations. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present invention. First ranking criteria and second ranking criteria are both ranking criteria, but they are not the same ranking criteria.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A method of tracking an imported file on an operating system of an electronic device configured to exchange data with a first mobile storage device, comprising:
   monitoring the operating system for a first event corresponding to the first mobile storage device being unmounted from the electronic device;
   in response to detecting the first event, recording a first time of the first event corresponding to the first mobile storage device being unmounted from the electronic device;
   after the first event, monitoring the operating system for a second event corresponding to the first mobile storage device being mounted into the electronic device;
   in response to detecting the second event, recording a second time of the second event corresponding to the first mobile storage device being mounted into the electronic device;
   after the second event:
      performing a scan of the first mobile storage device;
      storing the scanned data in a database of the operating system;
      recording a first storage path corresponding to the scanned data in the database;
      monitoring the operating system for a third event corresponding to completion of the scan;
      recording, in response to detecting the third event, a third time corresponding to the scan being completed; and
      accessing the database;
      retrieving a dataset with a time stamp greater than first time and smaller than the third time, in accordance with the first storage path and the timestamp; and
      displaying the retrieved dataset and the timestamp on a display of the electronic device;
   monitoring the operating system for a fifth event corresponding to a second mobile storage device being unmounted from the electronic device;
   in response to detecting the fifth event, recording a fifth time corresponding to the second mobile storage device being unmounted;
   after the fifth event, monitoring the operating system for a sixth event corresponding to the second mobile storage device being mounted into the electronic device;
   in response to detecting the sixth event, recording a sixth time corresponding to the second mobile storage device being mounted into the electronic device;
   after the sixth event:
      performing a second scan on the second mobile storage device;
      storing the scanned data in a second database of the operating system;
      recording a second storage path corresponding to the scanned data in the second database;
      monitoring the operating system for a seventh event corresponding to completion of the second scan;
      recording, in response to detecting the seventh event, a seventh time corresponding to the scan being completed;
      accessing the second database;
      retrieving a second dataset with a second timestamp greater than fifth time and smaller than the seventh time, in accordance with the second storage path and the second time stamp; and
      displaying the second dataset and the second timestamp on the display of the electronic device.

2. The method of claim 1, wherein the timestamp is greater than the second time.

3. The method of claim 1, further comprising:
   after the first event, monitoring the operating system for a fourth event corresponding to the first mobile storage device being unmounted; and
   in response to detecting the fourth event, recording a fourth time corresponding to the first mobile storage device being unmounted;
   wherein the timestamp is greater than the fourth time.

4. The method of claim 1, wherein:
   monitoring the operating system for the first event comprises registering, in a configuration file, an unmounting event of the first mobile storage device;
   monitoring the operating system for the second event comprises registering, in the configuration file, a mounting event of the first mobile storage device; and
   monitoring the operating system for the third event comprises registering a scan completed event in the configuration file.

5. The method of claim 1, wherein one or more of the first and the second mobile storage devices include a secure digital (SD) card.

6. The method of claim 1, wherein the operating system is an Android operating system.

7. An electronic device, comprising:
one or more processors;
memory; and
one or more programs, wherein the one or more programs are stored in memory and configured to be executed by the one or more processors, the one or more programs including an operating system and instructions that when executed by the one or more processors cause the electronic device to:
monitor the operating system for a first event corresponding to a first mobile storage device being unmounted from the electronic device;
in response to detecting the first event, record a first time of the first event corresponding to the first mobile storage device being unmounted from the electronic device;
after the first event, monitor the operating system for a second event corresponding to the first mobile storage device being mounted into the electronic device;
in response to detecting the second event, record a second time of the second event corresponding to the first mobile storage device being mounted into the electronic device;
after the second event:
  perform a scan of the first mobile storage device;
  store the scanned data in a database of the operating system;
  record a first storage path corresponding to the scanned data in the database;
  monitor the operating system for a third event corresponding to completion of the scan;
  record, in response to detecting the third event, a third time corresponding to the scan being completed; and
  access the database;
  retrieve a dataset with a timestamp greater than first time and smaller than the third time, in accordance with the first storage path and the timestamp; and
  display the retrieved dataset and the timestamp on a display of the electronic device;
monitor the operating system for a fifth event corresponding to a second mobile storage device being unmounted from the electronic device;
in response to detecting the fifth event, record a fifth time corresponding to the second mobile storage device being unmounted;
after the fifth event, monitor the operating system for a sixth event corresponding to the second mobile storage device being mounted into the electronic device;
in response to detecting the sixth event, record a sixth time corresponding to the second mobile storage device being mounted into the electronic device;
after the sixth event:
  perform a second scan on the second mobile storage device;
  store the scanned data in a second database of the operating system;
  record a second storage path corresponding to the scanned data in the second database;
  monitor the operating system for a seventh event corresponding to completion of the second scan;
  record, in response to detecting the seventh event, a seventh time corresponding to the scan being completed;
  access the second database;
  retrieve a second dataset with a second timestamp greater than fifth time and smaller than the seventh time, in accordance with the second storage path and the second timestamp; and
  display the second dataset and the second timestamp on the display of the electronic device.

8. The electronic device of claim 7, wherein the timestamp is greater than the second time.

9. The electronic device of claim 7, wherein the one or more programs further include instructions that cause the electronic device to:
after the second event, monitor the operating system for a fourth event corresponding to the first mobile storage device being unmounted; and
in response to detecting the fourth event, record a fourth time corresponding to the first mobile storage device being unmounted;
wherein the timestamp is greater than the fourth time.

10. The electronic device of claim 7, wherein:
monitoring the operating system for the first event comprises registering, in a configuration file, an unmounting event of the first mobile storage device;
monitoring the operating system for the second event comprises registering, in the configuration file, a mounting event of the first mobile storage device; and
monitoring the operating system for the third event comprises registering a scan completed event in the configuration file.

11. The electronic device of claim 7, wherein one or more of the first and the second mobile storage devices include a secure digital (SD) card.

12. The electronic device of claim 7, wherein the operating system is an Android operating system.

13. A non-transitory computer readable storage medium storing one or more programs, the one or more programs comprising an operating system and instructions, which when executed by an electronic device with one or more processors and memory, cause the electronic device to:
monitor the operating system for a first event corresponding to a first mobile storage device being unmounted from the electronic device;
in response to detecting the first event, record a first time of the first event corresponding to the first mobile storage device being unmounted from the electronic device;
after the first event, monitor the operating system for a second event corresponding to the first mobile storage device being mounted into the electronic device;
in response to detecting the second event, record a second time of the second event corresponding to the first mobile storage device being mounted into the electronic device;
after the second event:
  perform a scan of the first mobile storage device;
  store the scanned data in a database of the operating system;
  record a first storage path corresponding to the scanned data in the database;
  monitor the operating system for a third event corresponding to completion of the scan;
  record, in response to detecting the third event, a third time corresponding to the scan being completed; and
  accesses the database;
  retrieve a dataset with a timestamp greater than first time and smaller than the third time, in accordance with the first storage path and the timestamp; and
  display the retrieved dataset and the timestamp on a display of the electronic device;
monitor the operating system for a fifth event corresponding to a second mobile storage device being unmounted from the electronic device;

in response to detecting the fifth event, record a fifth time corresponding to the second mobile storage device being unmounted;

after the fifth event, monitor the operating system for a sixth event corresponding to the second mobile storage device being mounted into the electronic device;

in response to detecting the sixth event, record a sixth time corresponding to the second mobile storage device being mounted into the electronic device;

after the sixth event:
  perform a second scan on the second mobile storage device;
  store the scanned data in a second database of the operating system;
  record a second storage path corresponding to the scanned data in the second database;
  monitor the operating system for a seventh event corresponding to completion of the second scan;
  record, in response to detecting the seventh event, a seventh time corresponding to the scan being completed;
  access the second database;
  retrieve a second dataset with a second timestamp greater than fifth time and smaller than the seventh time, in accordance with the second storage path and the second time stamp; and
  display the second dataset and the second timestamp on the display of the electronic device.

14. The non-transitory computer readable storage medium of claim 13, wherein the timestamp is greater than the second time.

15. The non-transitory computer readable storage medium of claim 13, wherein the one or more programs further include instructions that cause the electronic device to:
  after the second event, monitor the operating system for a fourth event corresponding to the first mobile storage device being unmounted; and
  in response to detecting the fourth event, record a fourth time corresponding to the first mobile storage device being unmounted;
  wherein the timestamp is greater than the fourth time.

16. The non-transitory computer readable storage medium of claim 13, wherein:
  monitoring the operating system for the first event comprises registering, in a configuration file, an unmounting event of the first mobile storage device;
  monitoring the operating system for the second event comprises registering, in the configuration file, a mounting event of the first mobile storage device; and
  monitoring the operating system for the third event comprises registering a scan completed event in the configuration file.

17. The non-transitory computer readable storage medium of claim 13, wherein one or more of the first and the second mobile storage devices include a secure digital (SD) card.

* * * * *